United States Patent
Bergman et al.

(10) Patent No.: US 10,122,904 B2
(45) Date of Patent: Nov. 6, 2018

(54) DRAIN MECHANISM FOR CAMERA CONTROLLER

(71) Applicant: GoPro, Inc., San Mateo, CA (US)

(72) Inventors: Senka Agic Bergman, San Mateo, CA (US); Joyce Rosenbaum, Mountain View, CA (US)

(73) Assignee: GoPro, Inc., San Mateo, CA (US)

( * ) Notice: Subject to any disclaimer, the term of this patent is extended or adjusted under 35 U.S.C. 154(b) by 68 days.

(21) Appl. No.: 15/206,611

(22) Filed: Jul. 11, 2016

(65) Prior Publication Data

US 2018/0013946 A1 Jan. 11, 2018

(51) Int. Cl.
*H04N 5/232* (2006.01)
*H04N 5/225* (2006.01)
*H04R 1/02* (2006.01)

(52) U.S. Cl.
CPC ....... *H04N 5/23203* (2013.01); *H04N 5/2252* (2013.01); *H04R 1/028* (2013.01); *H04R 2499/11* (2013.01)

(58) Field of Classification Search
CPC .. H04N 5/23203; H04N 5/2252; H04R 1/028; H04R 2499/11
USPC ........................................ 348/222.1; 381/391
See application file for complete search history.

(56) References Cited

U.S. PATENT DOCUMENTS

| | | |
|---|---|---|
| D265,829 S | 8/1982 | Shimoda |
| D298,760 S | 11/1988 | Isao |
| D349,126 S | 7/1994 | Lee |
| 5,738,321 A | 4/1998 | Moriyasu |
| D724,637 S | 3/2015 | Samuels |
| D750,146 S | 2/2016 | Costa |
| 9,360,742 B1 | 6/2016 | Harrison |
| D768,752 S | 10/2016 | Silver |
| D776,741 S | 1/2017 | Parfitt |
| D785,696 S | 5/2017 | Parfitt |

(Continued)

OTHER PUBLICATIONS

Google Express iGoPro Karma Harness for HERO4 Black/Silver Camera—AGFHA-001, first reviewed on Mar. 17, 2017, © 2018 Google [online], [site visited Mar. 16, 2018]. Available from Internet, <URL: https://goo.gl/huqSGv/> (1 Pg).

(Continued)

*Primary Examiner* — Yogesh Aggarwal
(74) *Attorney, Agent, or Firm* — Young Basile Hanlon & MacFarlane, P.C.

(57) ABSTRACT

A camera controller is configured to control a camera through voice commands. The camera controller includes drain mechanisms that allow the camera controller to be used in environments in which the camera controller is exposed to fluids. The camera controller device comprises a housing body with an outer surface including a first opening and a second opening. A first channel extends from the first opening into the housing body and to a cavity in which a microphone is located, enabling audio signals entering the first opening to be captured by the microphone. A membrane is located between the first channel and the microphone to create a waterproof seal over the microphone. A second channel extends from the first channel to the second opening to create a drain such that fluid entering from the first opening can flow from the first channel through the second channel and out the second opening.

17 Claims, 6 Drawing Sheets

(56) References Cited

U.S. PATENT DOCUMENTS

| | | |
|---|---|---|
| D785,697 S | 5/2017 | Costa |
| 9,880,451 B2 | 1/2018 | Clearman |
| 2007/0071423 A1 | 3/2007 | Fantone |
| 2014/0185853 A1* | 7/2014 | Aihara .................. H04R 1/086 |
| | | 381/334 |
| 2014/0198932 A1* | 7/2014 | Parkins ................. H04R 1/086 |
| | | 381/189 |
| 2015/0326748 A1 | 11/2015 | Tisch |
| 2016/0004142 A1 | 1/2016 | Zhang |
| 2016/0100083 A1 | 4/2016 | Harrison |
| 2017/0059967 A1 | 3/2017 | Harrison |

OTHER PUBLICATIONS

GoPro i Shop i Mounts & Accessories, posted on Nov. 16, 2017, © 2018 GoPro, Inc. [online], [site visited Mar. 16, 2018]. Available from Internet, <URL: https://shop.gopro.com/mounts-accessories/> (13 Pgs).

Linxv i Action Camera Accessories i Action Camera Strap, posted on Jun. 4, 2016, © 2012 Avada [online], [site visited Mar. 16, 2018]. Available from Internet, <URL: http://www.linxv.com/action-camera-accessories/action-camera-strap/> (4 Pgs).

* cited by examiner

DRAIN MECHANISM FOR CAMERA CONTROLLER

BACKGROUND

Technical Field

This disclosure relates to cameras, and more specifically, to a controller for a camera.

Description of the Related Art

Digital cameras are increasingly used in outdoors and sports environments. During some outdoors and sports activities, a user may need one or both hands or may not be within reach of the digital camera. As such, it may be difficult for a user to operate the digital camera to capture images and/or video of the activity. A camera controller configured to control a camera with a wireless and hands-free method may allow users to capture the desired images and/or video in difficult environments.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 illustrates an environment in which a camera and a camera controller may be used, according to one example embodiment.

Figure 3B:
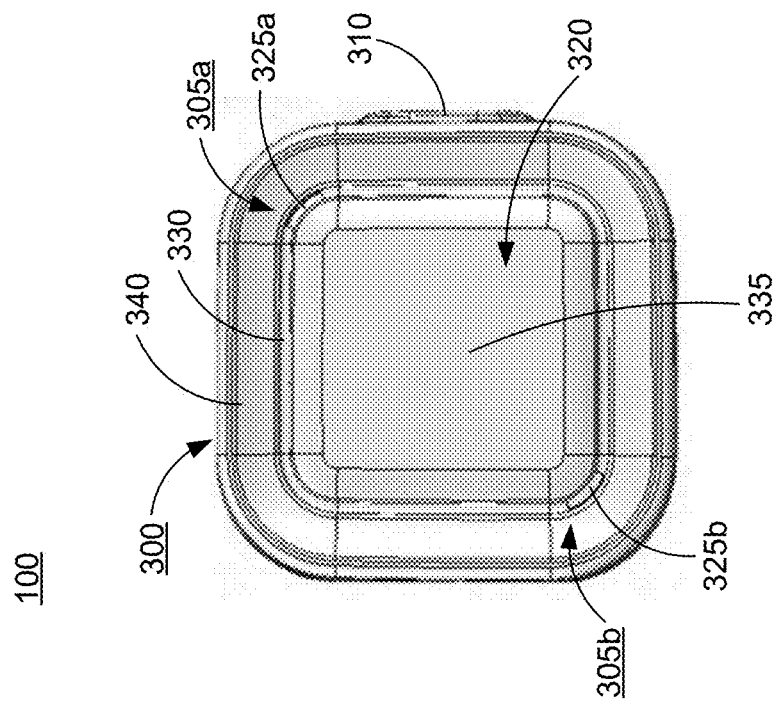
Figure 3A:
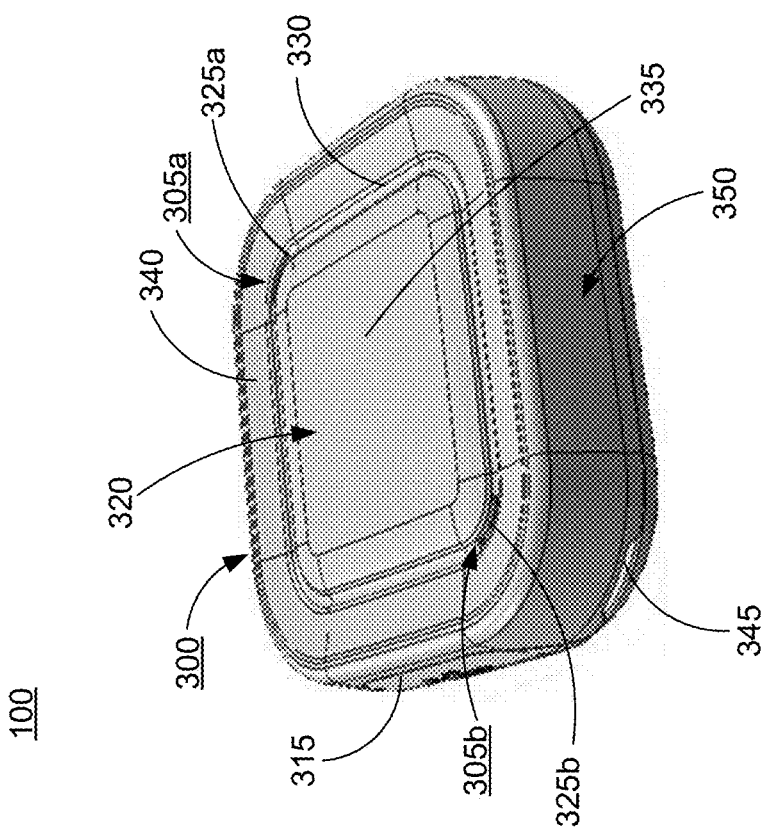

FIGS. 3A, B, and C illustrate perspective views of a camera controller, according to one embodiment.

Figure 4:
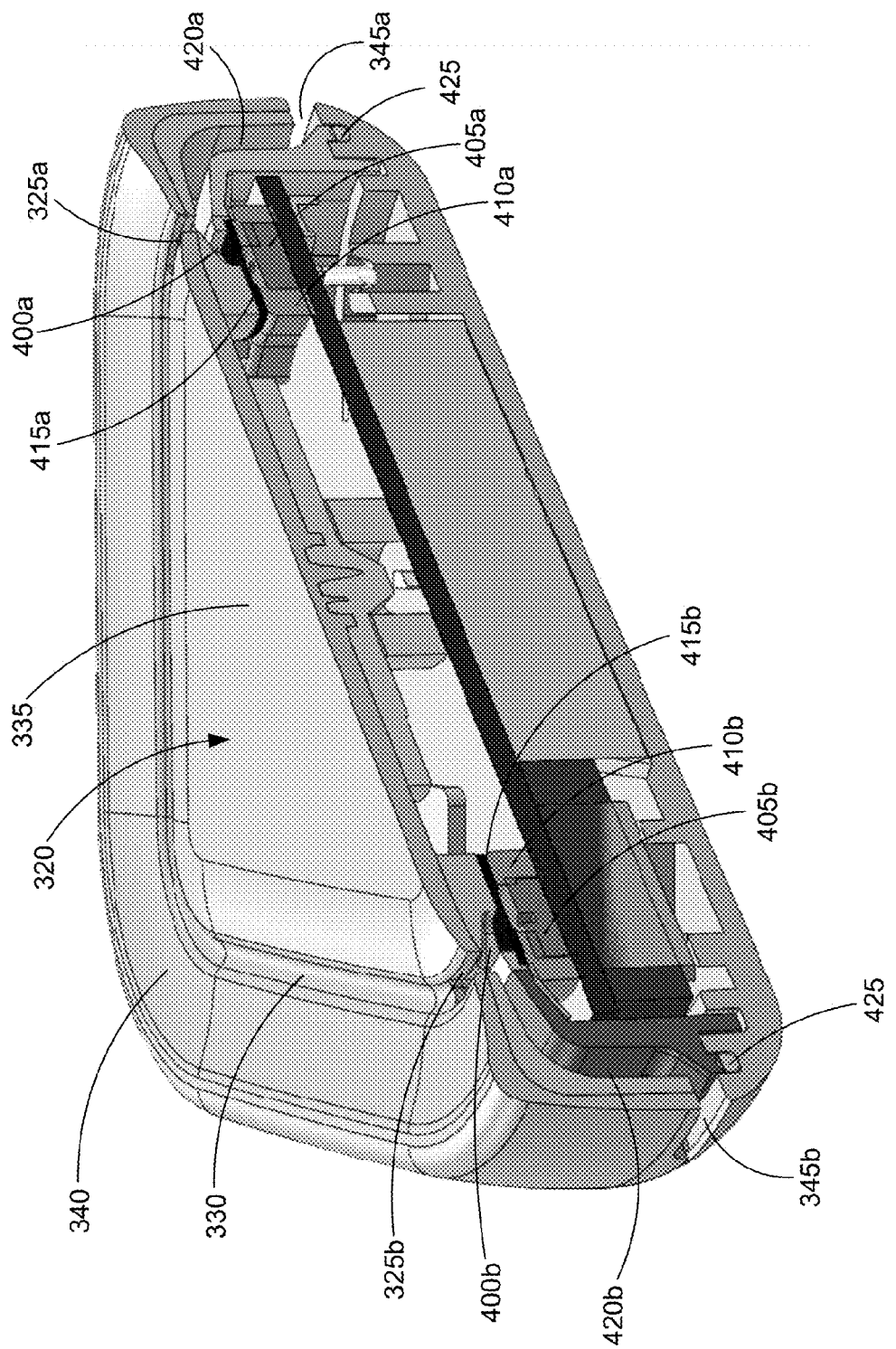

FIG. 4 illustrates a cross-sectional view of a camera controller, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

In one embodiment, a camera controller device is configured to enable the wireless and hands-free control of a camera. The camera controller device (or simply "camera controller") includes microphones embedded within a housing body of the camera controller and is configured to detect voice commands received via audio signals detected by the microphones. The camera controller includes one or more drain mechanisms that each allows the camera controller to be used in outdoors and sports environments in which the camera controller device may encounter fluids by providing a drainage channel through which fluids can flow out and away from the microphones. Each drain mechanism includes a first opening and a second opening on the outer surfaces of the housing body. A first channel extends from the first opening into the housing body and adjacent to a microphone cavity in which a microphone is located such that the microphone can capture audio signals entering the first channel. A membrane is located between the first channel and the microphone to create a waterproof seal around the microphone, thereby protecting the microphone from fluids that enter the first channel. A second channel extends from the first channel to the second opening to create a drain such that fluid entering from the first opening can flow from the first channel through the second channel and out the second opening.

Example Camera System and Camera Controller Configuration

Figure 1:
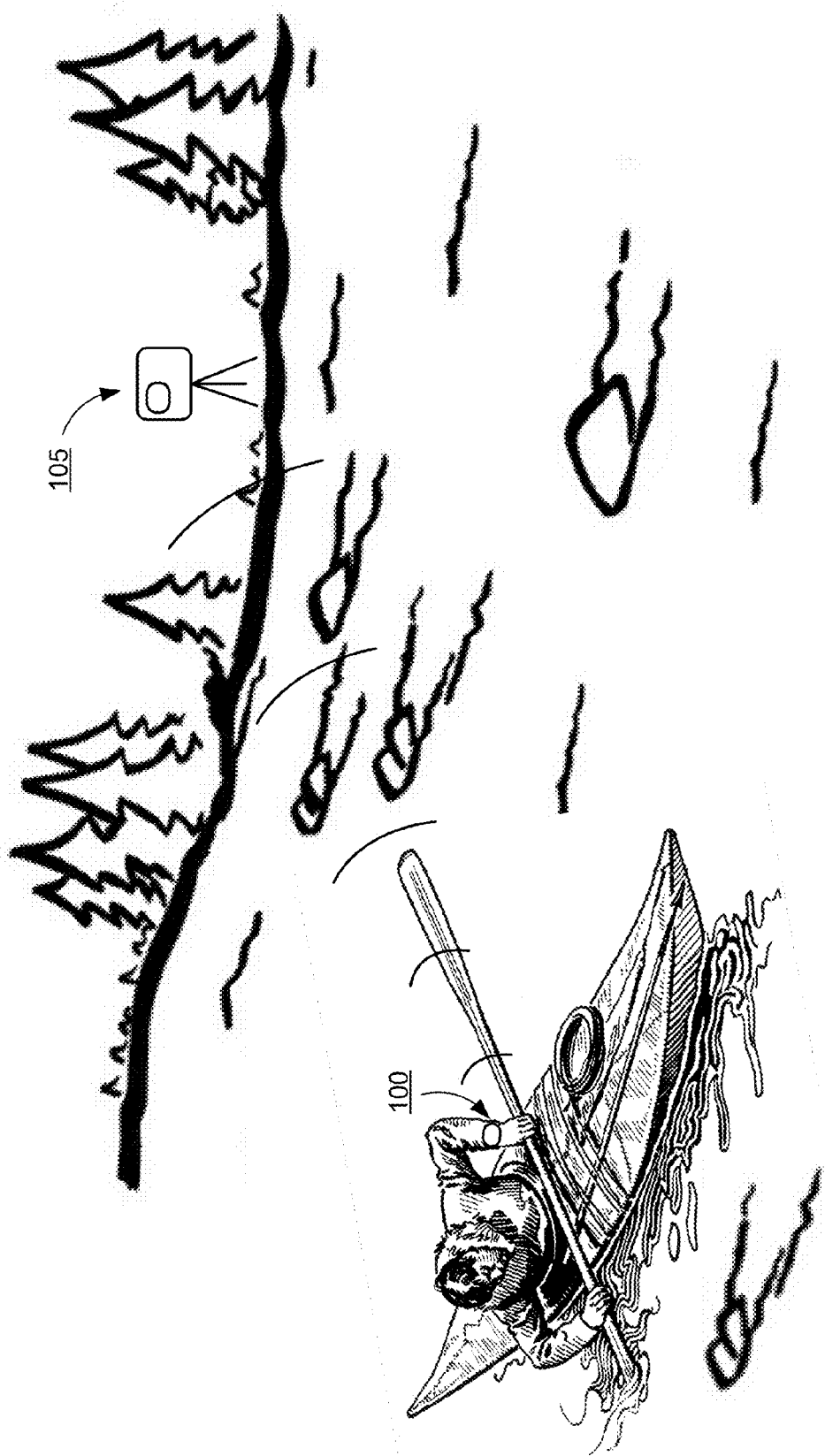

FIG. 1 illustrates an environment in which a camera and a camera controller may be used, according to one embodiment. Digital cameras are increasingly used in outdoor and sports environments to capture images and/or videos of one or more users performing an activity. Digital cameras can be positioned within the environment to capture a specific viewpoint or angle of the one or more users. Certain outdoor or sports activities may require a user to use one or more hands or to keep one or more hands available for use. Likewise, the user may not be within reach of the digital camera. In such situations, it can be difficult for the user to operate the digital camera to capture images and/or videos while performing an activity. As one example, one or more digital cameras can be positioned along a mountain (e.g., at the top of the mountain, at the bottom of the mountain, and at various points on the mountain) to capture video of the user from multiple viewpoints as the user snowboards down the mountain. Other example environments may include skiing, kayaking, river rafting, rowing, and other outdoor or sports activities in which a digital camera may be used. A camera controller configured to control a digital camera may allow a user to operate a digital camera remotely and/or in a hands-free manner.

In the embodiment of FIG. 1, a camera controller 100 is configured to control a camera 105 located remotely from the user by transmitting commands to the camera, causing the camera to perform actions based on the commands. The camera controller 100 may be a wearable or mountable device that can be worn by or attached to a user. The camera controller 100 may secure to a user through a variety of means, such as a clip-on mechanism, hook-and-loop fasteners (e.g., Velcro), a buckle, a neck lanyard, a carabineer, a wrist strap, or any suitable securing mechanism. In the embodiment of FIG. 1, the camera controller 100 can be secured to the wrist of the user via a wrist strap to which the camera controller may be removeably coupled.

In the embodiment of FIG. 1, the camera controller 100 is configured as an audio controller that detects voice commands and transmits the voice commands to the camera 105. Examples of voice commands may include, but are not limited to, commands such as "take a picture," "begin recording a video," "stop recording video," "tag the last video," or commands for any other function that the camera 105 may be configured to perform. Some embodiments of the camera controller 100 may be configured to receive a variety of types of commands, such as voice commands, button commands, motion detector commands, and/or some combination thereof.

Figure 2A:
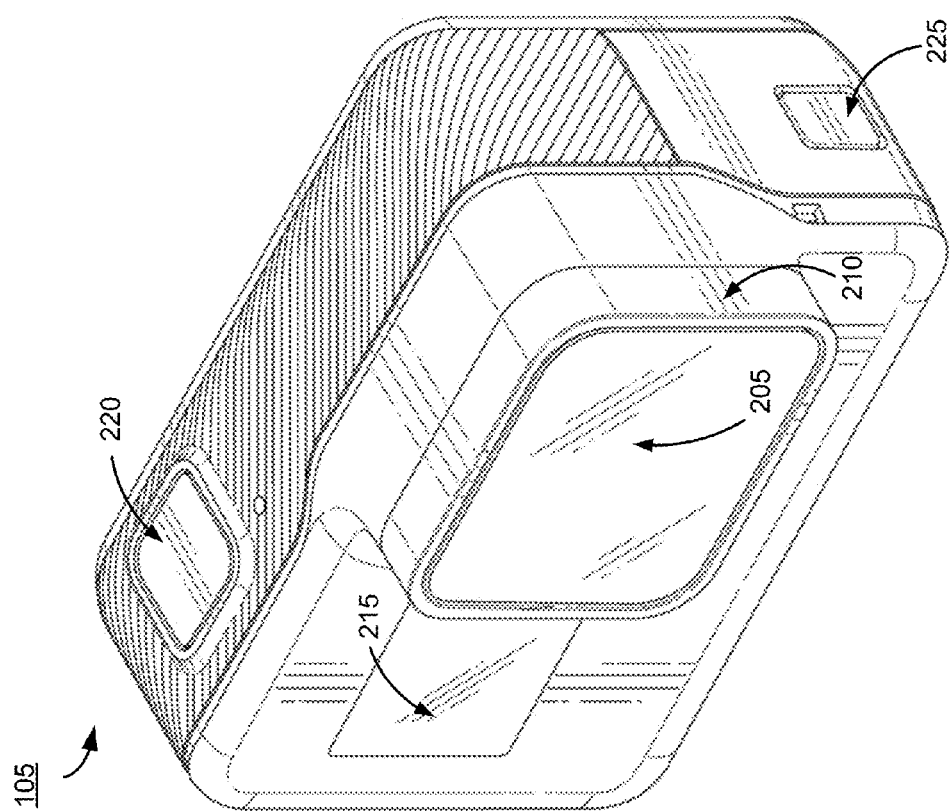
FIG. 2A illustrates a camera for use with the camera systems described herein, according to one embodiment.

FIG. 2A illustrates a camera 105 for use with the camera systems described herein, according to one embodiment. The camera 105 is configured to capture images and video, and to store captured images and video for subsequent display or playback. The camera 105 is adapted to fit within a camera housing, such as a camera frame or any other suitable housing. As illustrated, the camera 105 includes a lens 205 configured to receive light incident upon the lens and to direct received light onto an image sensor internal to the lens. The lens 205 is enclosed by a lens ring 210.

The camera 105 can include various indicators, including the LED display 215 shown in FIG. 1a. The camera 105 can also include a shutter button 220 configured to allow a user of the camera to interact with the camera, to capture images and video, and to perform other camera functions. The camera 105 can also include one or more microphones (not shown in FIG. 2A) configured to receive and record audio signals in conjunction with recording video. The side of the camera 105 includes an I/O interface 225. Though the embodiment of FIG. 2A illustrates the I/O interface 225 enclosed by a protective door, the I/O interface can include any type or number of I/O ports or mechanisms, such as USB ports, HDMI ports, memory card slots, and the like.

Figure 2B:
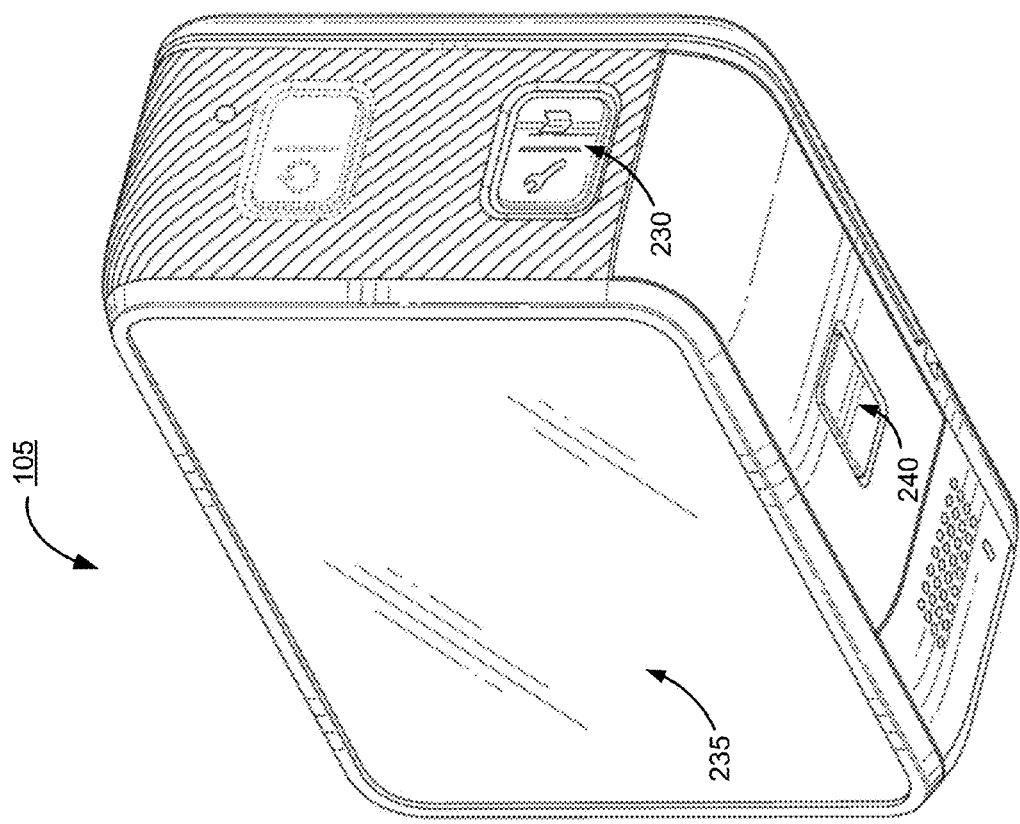
FIG. 2B illustrates a perspective view of a rear of a camera for use with the camera system, according to one embodiment.

FIG. 2B illustrates a perspective view of a rear of a camera 105 for use with the camera system, according to one embodiment. The camera 105 includes a button 230 configured to enable a user to interact with the camera, for instance by performing one or more camera functions, by configuring the camera into one or more camera modes, to adjust camera settings, and the like. The camera 105 includes a display 235 configured to display camera information or image information (such as captured images or viewfinder images). In some embodiments, the display 235 comprises a touch-screen display enabling a user of the camera 105 to interact with the camera via the display. The camera also includes an expansion pack interface 240 configured to receive a removable expansion pack, such as a display module, an extra battery module, a wireless module, and the like. Removable expansion packs, when coupled to the camera 105, provide additional functionality to the camera via the expansion pack interface 240.

Figure 3C:
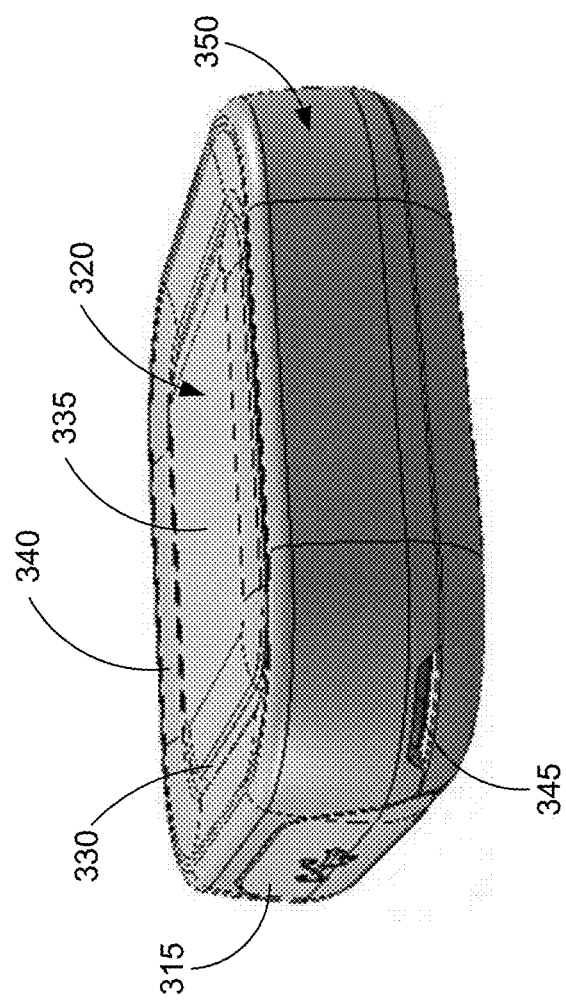

FIGS. 3A, B, and C illustrate perspective views of a camera controller 100, according to one embodiment. The camera controller 100 includes a housing 300, one or more drain mechanisms 305a and 305b (referred to individually as "drain mechanism 305" hereinafter), a charging port 310, and a data port 315. The housing 300 is configured to enclose internal components of the camera controller 100. In the embodiment of FIGS. 3A-C, the housing 300 is substantially square-shaped with rounded corners and edges. In some embodiments, the shape of the housing 300 may vary to resemble other regular or irregular shapes. In the embodiments of FIGS. 3A-C, the housing 300 is designed to have a small form factor, such that the camera controller 100 can be worn by or secured to a user. In some embodiments, the camera controller 100 is configured to removeably mount to a mounting enclosure secured to a wrist strap or configured to clip onto an object, and may have dimensions similar to those of a face of a watch. The mounting enclosure may secureably enclose the sides and rounded edges of the housing 300, thereby securing the camera controller 100.

The housing 300 may be composed of rigid materials (e.g., metal, plastic, etc.) or semi-rigid materials (e.g., rubber, soft plastic, etc.).

The housing 300 has a top surface 320 that includes one or more microphone ports 325, a recess 330, a central face 335, and an outer face 340. The microphone ports 325 are openings configured to allow audio signals to enter the microphone ports for capture by microphones embedded within the camera controller 100. In the embodiments of FIGS. 3A-C, the camera controller 100 has two microphone ports 325a and 325b, each located at opposite corners of the top surface 320. This configuration allows the camera controller 100 to capture audio signals from multiple angles. Some embodiments may have only one microphone port or may have more than two microphone ports, wherein each microphone port corresponds to a different microphone within the housing. The microphone ports 325 are positioned within the recess 330, which runs around a perimeter of the top surface 320, separating the central face 335 from the outer face 340 of the top surface. The central face 335 includes a slight camber such that the central face is elevated in the center and slopes downwards towards the recess 330. The outer face 340 of the top surface 320 surrounds the recess 330 and slopes downwards towards the recess. The recess 330 is configured to channel and direct fluids away from the one or more microphone ports 325, via capillary forces. The shape and orientation of the various portions of the top surface 320 prevent fluids from collecting on the top surface of the camera controller 100 during certain outdoor and sports activities in which the camera controller may encounter fluids (e.g., water during aquatic sports or activities).

The drain mechanisms 305 are designed to drain fluid away from the one or more microphone ports 325 on the top surface 320. Each drain mechanism 305 includes a drain opening 345. In the embodiments of FIGS. 3A-C, the drain opening 345 is an opening on a side surface 350 of the housing 300. A drain mechanism 305 is positioned such that fluid that enters a microphone port 325, despite the recess 330, exits out of the drain opening 345. The drain mechanism 305 will be discussed in further detail with regards to FIG. 4.

The camera controller 100 further includes the charging port 310 and the data port 315. The charging port 310 is configured to charge a power source within the camera controller 100. In the embodiments of FIGS. 3A-C, the charging port 310 is located on the side surface 350, but the position may vary. In some embodiments, the charging port 310 may be water-resistant or may include a removeable cover that has a water-resistant seal when covering the charging port. The data port 315 is configured to transfer data from the camera controller 100 to an external data store, to allow a user to transfer data to the camera controller 100 (for instance, in order to configure the camera controller), or to enable any other suitable I/O functionalities. The data port 315 also includes a removeable cover that has a water-resistant seal when covering the data port.

FIG. 4 illustrates a cross-sectional view of a camera controller 100, according to one embodiment. The housing 300 includes a sound channel 400, a microphone 405, a ring enclosure 410, and a membrane 415, each configured to enable the camera controller 100 to capture voice commands spoken or otherwise communicated by a user. In the embodiment of FIG. 4, the camera controller 100 includes two microphone ports 325a and 325b, each corresponding to a different microphone. The sound channel 400 is a channel or opening that extends from the microphone port 325 to the microphone 405. The sound channel 400 is configured to enable the passage of audio signals from the microphone port 325, through the sound channel, and to the microphone 405 for capture by the microphone 405. The microphone 405 is secured within a ring enclosure 410 that at least partially encompasses the microphone. A membrane 415 is coupled to the ring enclosure and over the microphone such that the ring enclosure and membrane collectively create a waterproof seal over the microphone. The membrane 415 is further configured to allow audio signals to pass through the membrane for capture by the microphone 405, thus enabling the microphone to detect voice commands from a user while preventing water or other fluids from damaging the microphone.

The drain mechanism 305 helps to prevent fluid from collecting on or adjacent to the membrane 415. The drain mechanism 305 includes a drain channel 420 that extends from the sound channel 400 to the drain opening 345. In the embodiment of FIG. 4, the drain opening 345 is located on the side surface 350, but in some embodiments it may be located on a bottom surface of the housing 300. The drain channel 420 extends from the sound channel 400 to shunt fluid that otherwise may collect on or adjacent to the membrane 415 or plug the microphone port 325 or sound channel 400 away from these areas and out of the camera controller 100. Such fluids might otherwise block the pathway for audio signals to travel to the microphone 405.

The drain channel 420 is configured to create a pathway between the microphone port 325 and the drain opening 345 such that fluid entering the microphone port 325 can flow from the sound channel 400 through the drain channel 420 and out the drain opening 345. In the embodiment of FIG. 4, the sound channel 400 and the drain channel 420 angle downwards away from the top surface 320 of the camera controller and towards a side or bottom of the camera controller such that fluid can flow easily from the microphone port 325 away from the microphone 405 and to the drain opening 345. The housing 300 may also include one or more structures, such as a gasket 425 around the perimeter of an inside surface of the housing and between the drain channel 420 and a portion of the camera controller body to prevent fluid from entering various parts of the housing from the drain mechanism 305.

The configurations described herein beneficially allow the camera controller 100 to operate in outdoor and sports environments in which the camera controller may encounter fluids by allowing fluids to drain away from microphones. It should also be noted that while the drain mechanisms 305 described herein are used to enable fluid to drain away from microphones, in practice similar drain mechanisms can be used to drain fluid away from any electrical or mechanical component.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for camera controllers as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera controller device comprising:
a housing body, the housing body including a first opening and a second opening, a top surface of the camera controller device including a recess running around a perimeter of the top surface, the top surface further including a camber such that a center portion of the top surface is elevated and slopes downwards towards the recess;
a first channel extending from the first opening into the housing body;
a microphone located within the housing body and configured to capture audio signals entering the first channel via the first opening;
a membrane located between the first channel and the microphone, the membrane creating a waterproof seal over the microphone; and
a second channel extending from the first channel to the second opening, the second channel creating a drain such that fluid entering the first opening can flow from the first channel through the second channel and out the second opening.

2. The camera controller device of claim 1, wherein the recess creates a channel for fluid to prevent the fluid from collecting on the top surface.

3. The camera controller device of claim 2, wherein the first opening is positioned within the recess.

4. The camera controller device of claim 1, wherein the second opening is located on a side surface of the housing body.

5. The camera controller device of claim 1, wherein the second opening is located on a bottom surface of the housing body.

6. The camera controller device of claim 1, further comprising a gasket between the second channel and the housing body to prevent fluid from entering the housing body from the second channel.

7. The camera controller device of claim 1, wherein the membrane enables the transmission of audio signals through the membrane but prevents the passage of fluid through the membrane.

8. The camera controller device of claim 1, wherein the second channel angles away from the top surface of the camera controller device and towards a side surface of the camera controller device.

9. A camera controller device comprising:
- a plurality of microphones configured to capture audio signals;
- for each microphone:
  - a first opening on a first surface of the camera controller device, the first surface including a recess running around a perimeter of the first surface and a camber such that a center portion of the first surface is elevated and slopes downwards towards the recess;
  - a sound channel from the first opening to the microphone; and
  - a second opening on a second surface of the camera controller device; and
  - a drainage channel from the sound channel to the second opening such that fluid entering the first opening can flow through the sound channel, through the drainage channel, and out of the second opening.

10. The camera controller device of claim 9, wherein the recess creates a channel for fluid to prevent the fluid from collecting on the first surface.

11. The camera controller device of claim 10, wherein the first opening is positioned within the recess.

12. The camera controller device of claim 9, wherein the second surface is a side surface of a housing body of the camera controller device.

13. The camera controller device of claim 9, wherein the second surface is a bottom surface of a housing body of the camera controller device.

14. The camera controller device of claim 9, further comprising a gasket between the drainage channel and a housing body of the camera controller device to prevent fluid from entering the housing body from the drainage channel.

15. The camera controller device of claim 9, wherein a membrane is located between the sound channel and the microphone, the membrane configured to create a waterproof seal over the microphone, the membrane further configured to enable the transmission of audio signals through the membrane but prevent the passage of fluid through the membrane.

16. The camera controller device of claim 9, wherein the drainage channel angles away from the first surface of the camera controller device and towards the second surface of the camera controller device.

17. A camera controller device comprising:
- a housing body including a first opening, a second opening, and a top surface having a recess running around a perimeter of the top surface to create a channel for fluid to prevent the fluid from collecting on the top surface, the first opening being positioned within the recess;
- a first channel extending from the first opening into the housing body;
- a microphone located within the housing body and configured to capture audio signals entering the first channel via the first opening;
- a membrane located between the first channel and the microphone, the membrane creating a waterproof seal over the microphone; and
- a second channel extending from the first channel to the second opening, the second channel creating a drain such that fluid entering the first opening can flow from the first channel through the second channel and out the second opening.

* * * * *